(12) United States Patent
Zubrod

(10) Patent No.: US 11,390,562 B1
(45) Date of Patent: Jul. 19, 2022

(54) PROCESS FOR PREPARING COLD FUSION CONCRETE AND CEMENT COMPOSITIONS FROM METAL MINING AND PRODUCTION WASTE

(71) Applicant: Geopolymer Solutions, LLC, Conroe, TX (US)

(72) Inventor: Rodney Zubrod, Conroe, TX (US)

(73) Assignee: Geopolymer Solutions, LLC, Conroe, TX (US)

( * ) Notice: Subject to any disclaimer, the term of this patent is extended or adjusted under 35 U.S.C. 154(b) by 0 days.

(21) Appl. No.: 17/696,793

(22) Filed: Mar. 16, 2022

(51) Int. Cl.
*C04B 28/26* (2006.01)
*C04B 14/26* (2006.01)
*C04B 18/12* (2006.01)
*C04B 24/06* (2006.01)
*C04B 24/14* (2006.01)
*C04B 22/08* (2006.01)
*C04B 103/22* (2006.01)

(52) U.S. Cl.
CPC .............. *C04B 28/26* (2013.01); *C04B 14/26* (2013.01); *C04B 18/12* (2013.01); *C04B 22/082* (2013.01); *C04B 24/06* (2013.01); *C04B 24/14* (2013.01); *C04B 2103/22* (2013.01)

(58) Field of Classification Search
CPC ....... C04B 14/26; C04B 18/12; C04B 22/082; C04B 24/06; C04B 24/14; C04B 28/26; C04B 2103/22
See application file for complete search history.

(56) References Cited

U.S. PATENT DOCUMENTS

| | | |
|---|---|---|
| 8,617,452 B2 | 12/2013 | Zubrod |
| 9,670,096 B1 | 6/2017 | Zubrod |
| 9,725,365 B1 | 8/2017 | Zubrod |
| 9,932,269 B2 | 4/2018 | Zubrod |
| 9,944,560 B2 | 4/2018 | Zubrod |
| 10,196,310 B2 | 2/2019 | Zubrod et al. |
| 10,954,162 B1 | 3/2021 | Zubrod |
| 2021/0087114 A1 | 3/2021 | Zubrod |

FOREIGN PATENT DOCUMENTS

| | | | |
|---|---|---|---|
| AU | 2017306058 | | 2/2019 |
| AU | 2017306061 | | 2/2019 |
| BR | 112019001891 | | 5/2019 |
| BR | 112019002153 | | 5/2019 |
| CA | 3032402 | | 2/2018 |
| CA | 3032407 | | 2/2018 |
| CN | 103803938 A | * | 5/2014 |
| CN | 113149530 A | * | 7/2021 |
| CN | 109790072 | | 12/2021 |
| CN | 109982987 | | 12/2021 |
| EP | 3494095 | | 6/2019 |
| EP | 3494098 | | 6/2019 |
| IN | 354428 | | 4/2019 |
| IN | 201917003464 | | 5/2019 |
| JP | 6761125 | | 9/2020 |
| JP | 6785379 | | 11/2020 |
| KR | 102247280 | | 5/2021 |
| KR | 102254293 | | 5/2021 |
| MX | 2019001396 | | 9/2019 |
| MX | 2019001398 | | 9/2019 |
| RU | 2721049 | | 5/2020 |
| RU | 2721988 | | 5/2020 |
| WO | WO 2018026711 | | 2/2018 |
| WO | WO 2018026714 | | 2/2018 |

\* cited by examiner

*Primary Examiner* — Anthony J Green
(74) *Attorney, Agent, or Firm* — Fish & Richardson P.C.

(57) ABSTRACT

Methods of preparing cold fusion concrete and cement using mining waste are described.

15 Claims, 3 Drawing Sheets

PROCESS FOR PREPARING COLD FUSION CONCRETE AND CEMENT COMPOSITIONS FROM METAL MINING AND PRODUCTION WASTE

TECHNICAL FIELD

This invention relates to processing mining waste to prepare cold fusion concrete and cement compositions with and without metal carbonates.

BACKGROUND

Mining operations create waste products (mining residue) containing metal oxides, hydroxides, carbonates, sulfites, sulfates, sulfides, and other solid and liquid chemicals. For example, the Bayer process of extracting alumina from bauxite mineral formulations creates substantial amounts of potentially hazardous bauxite residue containing sodium hydroxide, ferrous oxide, silicon dioxide, aluminum oxide, calcium hydroxide, titanium, and other trace materials, and is sometimes radioactive. The extraction of one ton of alumina creates from one to two tons of bauxite residue. The bauxite residue accumulates in unused stockpiles for generations. Moreover, because the majority of residue impoundments are not necessarily located near the bauxite source, many different bauxite source residues can exist in a single impoundment with somewhat variable characteristics.

Lithium, which is primarily processed for use in batteries, is mined in open pits as a carbonate, but brine mining and processing is also commonly used. The byproducts of lithium processing and mining include various sulfites, sulfates, carbonates, oxides, and hydroxides. The waste from brine mining typically produces two separate materials comprising metals hydroxides and oxides on one side, and sulfites on the other. The metal hydroxides and oxides consist of manganese, ferrous, magnesium, and other minor materials. The sulfites consist primarily of zinc, but also lithium and other metals.

Copper, gold, silver, uranium, coal, and many other materials that are mined and processed produce tailings or other waste that requires permanent storage. Many of these materials contain hazardous chemicals, heavy metals, or high or low pH materials. All of these materials contain significant amounts of $SiO_2$.

SUMMARY

The inventor has discovered a process for preparing cold fusion concrete and cement using mining waste. In addition to converting potentially hazardous mining waste into a useful material, the method can, in some embodiments, perform the function of carbon sequestration by converting carbon dioxide into metal carbonates. Thus, in one aspect, there is disclosed a method of producing a cold fusion concrete composition comprising combining:
(a) from 20 to 70% by weight of mining waste;
(b) from 5 to 30% by weight of an alkali metasilicate or metasilicate pentahydrate;
(c) from 1 to 15% by weight of a set reducing agent selected from the group consisting of sodium tetraborate, boric acid, citric acid, and combinations thereof;
(d) from 20 to 70% by weight of an agent selected from the group consisting of granulated ground blast furnace slag, fly ash, synthetic or natural pozzolan that contains about 1 to 60% by weight of calcium hydroxide, and combinations thereof;
(e) from 0.01 to 2% by weight of an agent that aids in the formation of covalent bonds selected from the group consisting of sodium caseinate, calcium caseinate, natural protein, synthetic protein, and combinations thereof;
(f) from 0.01 to 2% by weight of an agent capable of minimizing composition shrinkage selected form the group consisting of oxides, hydroxides, sulfates, and combinations thereof; and
(g) water, to produce a cold fusion concrete composition having a pourable consistency.

Examples of mining waste that can be used include bauxite waste, metal mine tailings, lithium mining waste, coal tailings, and combinations thereof. In some embodiments, the method includes pre-treating the mining waste with a disassociating agent followed by adding 0.2 to 15% by weight of a carbon dioxide source to form metal carbonates. The carbon dioxide source may be in the form of a gas, a super critical liquid, or a bubble.

The dissociating agent may be selected from the group consisting of hydrogen peroxide, acids, and combinations thereof. For example, in some embodiments, the dissociating agent is an acid selected from the group consisting of oxalic acid, hydrochloric acid, carbonic acid, nitric acid, phosphoric acid, acetic acid, and combinations thereof.

In some embodiments, the method includes pre-treating the mining waste with from 5 to 35% by weight of a pH adjusting agent before addition of the carbon dioxide source such that the pH of the mining waste is between 8 and 14. The pH adjusting agent may be applied before the dissociating agent in some embodiments. The pH adjusting agent may be selected from the group consisting of alkali metal hydroxides, alkali metal metasilicates, Red Mud, and combinations thereof.

In some embodiments, the method includes comprising curing the composition by exposing the composition to ambient conditions, a direct current electrical charge, an alternating current charge, ultraviolet light, a temperature ranging from 100° F. to 160° F., or combination thereof until desired strength is achieved.

In some embodiments, the method includes adding from 20 to 60% by weight aggregates to the composition. The aggregates may be naturally occurring or synthetic aggregates. In some embodiments, the aggregates are produced by separating a cold fusion concrete composition into size fractions ranging from 200 um to 50 mm and curing the size fractions.

In a second aspect, there is disclosed a method of producing a cold fusion cement composition comprising combining:
(a) from 20 to 70% by weight of mining waste;
(b) from 5 to 30% by weight of an alkali metasilicate or metasilicate pentahydrate;
(c) from 1 to 15% by weight of a set reducing agent selected from the group consisting of sodium tetraborate, boric acid, citric acid, and combinations thereof;
(d) from 20 to 70% by weight of an agent selected from the group consisting of granulated ground blast furnace slag, fly ash, synthetic or natural pozzolan that contains about 1 to 60% by weight of calcium hydroxide, and combinations thereof;
(e) from 0.01 to 2% by weight of an agent that aids in the formation of covalent bonds selected from the group consisting of sodium caseinate, calcium caseinate, natural protein, synthetic protein, and combinations thereof; and (f) from 0.01 to 2% by weight of an agent capable of minimizing composition shrinkage selected form the group consisting of oxides, hydroxides, sulfates, and combinations thereof.

Examples of mining waste that can be used include bauxite waste, metal mine tailings, lithium mining waste, coal tailings, and combinations thereof. In some embodiments, the method includes (a) pre-treating the mining waste with a disassociating agent followed by adding 0.2 to 15% by weight of a carbon dioxide source to form metal carbonates; and (b) drying and grinding the metal carbonates into a powder with a maximum particle size of 50 microns. In some embodiments, the method includes grinding the cold fusion cement composition to a particle size of from 0.1 to 5 microns.

The details of one or more embodiments of the invention are set forth in the accompanying drawings and the description below. Other features, objects, and advantages of the invention will be apparent from the description and drawings, and from the claims.

DETAILED DESCRIPTION

A. Definitions

Figure 1:
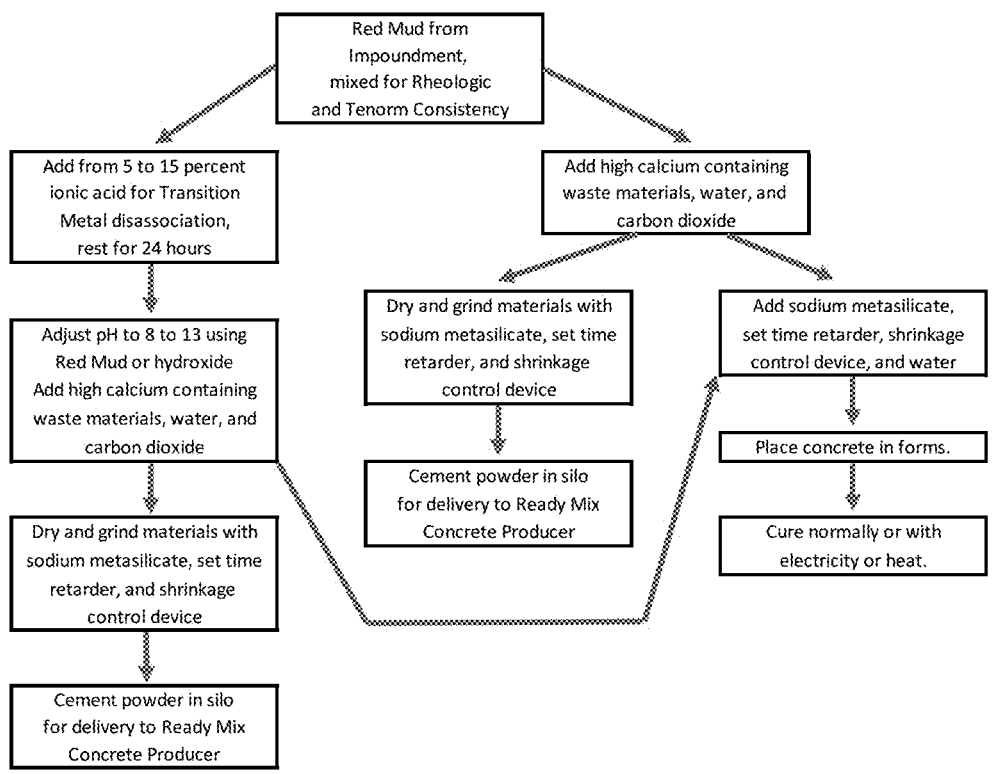
FIG. 1 is a flow chart illustrating mining waste processing to form cold fusion concrete or cement where the mining waste is Red Mud.

As used herein, the term "cold fusion concrete" or "cold fusion cement" are industry terms characterizing silicon dioxide and aluminum bearing pozzolans that are activated and bound by alkalis, alkali salts, and alkali hydroxides and oxides that are inherent to installed pozzolans, that form a hardened material used in the transportation, infrastructure, and general building and construction industries, and as a specialty chemical and/or heat resistant concrete. Cold fusion concrete and cement may or may not use Portland materials and use no liquid hydroxide additives as a primary activator or a pH elevator. Cold fusion concrete or cement, in accordance with the present disclosure, conforms as a hydraulic cement in general accordance with the ASTM C1157 Standard Performance Specification for Hydraulic Cements.

As used herein, the term "Geopolymer Cement" or "Alkali-activated Cement" is an industry term characterizing silicon dioxide and aluminum bearing pozzolans that are activated and bound by alkalis, alkali salts, and alkali hydroxides, that form a hardened material used in the transportation, infrastructure, and general building and construction industries, and as a specialty chemical and/or heat resistant concrete. Geopolymer and Alkali-activated Cements may or may not contain Portland, most typically contain liquid hydroxides and silicates as activators to attain durability characteristics and gain strength. While Cold Fusion Concrete typically conforms as a Hydraulic Cement, and while Cold Fusion Concrete is generally defined as a Geopolymer Cement, Geopolymer Cements do not typically conform as a Hydraulic Cement because they are not typically activated with water but are activated with liquid silicates and hydroxides.

As used herein, the term "Cementitious Materials" refers to a fine grained material, which has cementing value when used in concrete either by themselves, such as Cold Fusion Concrete Cement, Geopolymer Cement, Portland cement, blended hydraulic cements, and expansive cement, or such materials in combination with fly ash, other raw or calcined natural pozzolans, silica fume, aluminosilicates, fumed silica, kaolin, attapulgite, zeolites, diatomaceous earth, and/or ground granulated blast-furnace slag create a cementing effect.

As used herein, the term "aggregate/s" refers to any natural or synthetic aggregate that is crushed or rounded and useful as a filler in Portland, geopolymers, and cold fusion types of concrete. Aggregates are a granular material, such as sand, gravel, crushed stone, and iron blast-furnace slag, used with a cementing medium to form a concrete or mortar.

As used herein, the term "Set Time Retarders" refers to any dry or liquid admixture added to Portland, Geopolymer, or Cold Fusion cements and concretes to retard the time of setting, and to provide more work-ability time during construction and maintenance efforts of various features.

As used herein, the term "Protein" or "Synthetic Protein Material" refers to large biomolecules, or macromolecules, inclusive of one or more long chains of amino acid residues. For the protein to be useful in Geopolymer or Cold Fusion types of cements or concrete, the DNA chain must produce a covalent bond between the mixture silicates and produced hydroxides, therein temporarily adjusting the ionic concentration (up or down) and reducing and/or removing the sticky and tacky characteristic inherent in most Geopolymer types of cement, and reducing mixture volume change from a higher quality restructuring of the ions during reformation after the protein effect has terminated due to a pH reduction, temperature deviation, or time.

As used herein, the term "Mine Tailing/s" refers to the residue or by-products of mining and processing various minerals and metals including gold, copper, silver, uranium, lithium, ferrous, and other Alkali Metals, Alkaline Earth Metals, Transition Metals, and other metals. The waste residue from the mining and processing of coal for power generation is referred to as "Tailing/s."

As used herein, the term "red mud" refers to the alkaline residue left from the Bayer Process of extracting alumina from the Bauxite Mineral. The term "red mud" is sometimes referred to as "brown mud," which is the residue from the additional extraction of alumina from "red mud."

As used herein, the term "liquor" refers to the spent or reused liquid originally comprised of a single liquid such as sodium hydroxide that is used to extract various materials from compositions, products, organics, or minerals, but after initial use becomes enriched with the dissolved components of the compositions, products, organics, or minerals but is still used for continued extraction whether augmented with fresh liquid, or not.

As used herein, the term "Calcium Silicate Aluminum Hydrate" or "Calcium Silicate Hydrate" is the generic term identifying the formation of silicate hydrates in cold fusion concrete, Portland cement concrete, geopolymer Concretes, and alkali-activated concrete. The long chain molecular structure may vary between the various concretes, but a silicon dioxide molecule with variable ion concentrations always exists.

As used herein, the term "ionic liquid/s" or "ionic acids/s" refers to any liquid that serves to dissociate various ionic bonds, thereby allowing the metal to react with the carbon dioxide to form metal carbonates. The "disassociation" refers to the physical transformation of the metal ions prior to the formation of metal carbonates.

B. General Description

The inventor has discovered that hydroxides and silicates in mining waste are beneficial when combined with cold fusion concrete and cement technology. This was discovered while developing cold fusion concrete materials using red mud, which is the residue from the Bayer process of extracting alumina from the bauxite mineral. The process is generally described in the flow chart presented in FIG. 1.

As discussed in the Background, the Bayer process leaves a sodium hydroxide rich waste. The sodium hydroxide rich waste is deposited in large impoundments where the silicon dioxide concentrations in the bauxite are digested into the sodium hydroxide, leaving a variable molar concentration and combination of sodium silicate and sodium hydroxide, along with other associated and disassociated metal materials.

Similarly, the sodium hydroxide used in the Bayer process is reused several times prior to refreshment, or replacement with new sodium hydroxide. After initial use, the sodium hydroxide is then referred to as "liquor" by the Alumina Industry, as it is defined by many other industries like the paper industry. As the liquor is reused, it increases in silicon dioxide content until the silicon dioxide and other material content is so great that the liquor must be refreshed or disposed of due to its inability to digest the alumina in the bauxite mineral efficiently.

The liquor is a significant portion of the red mud. Due to the elevated silicon dioxide content in the liquor, the liquor itself is a viable candidate for use in cold fusion concrete, with or without the red mud solids, as an elevated pH material that further digests additional silicon dioxide from pozzolans, reacts with the calcium hydroxide portions of pozzolans to create calcium silicate hydrate (CSH)/calcium silicate aluminum hydrate (CSAH), and, reacts with other cold fusion concrete ingredients to achieve compressive strength in excess of 3,000 pounds per square inch (psi) strength with low to negligible volume change and a controlled set time. The combination of liquor, with or without red mud, can produce a concrete material of high strength, extremely low permeability, and extremely high resistance to climatic variances and chemical exposure due to the high silicon dioxide content.

Figure 3:
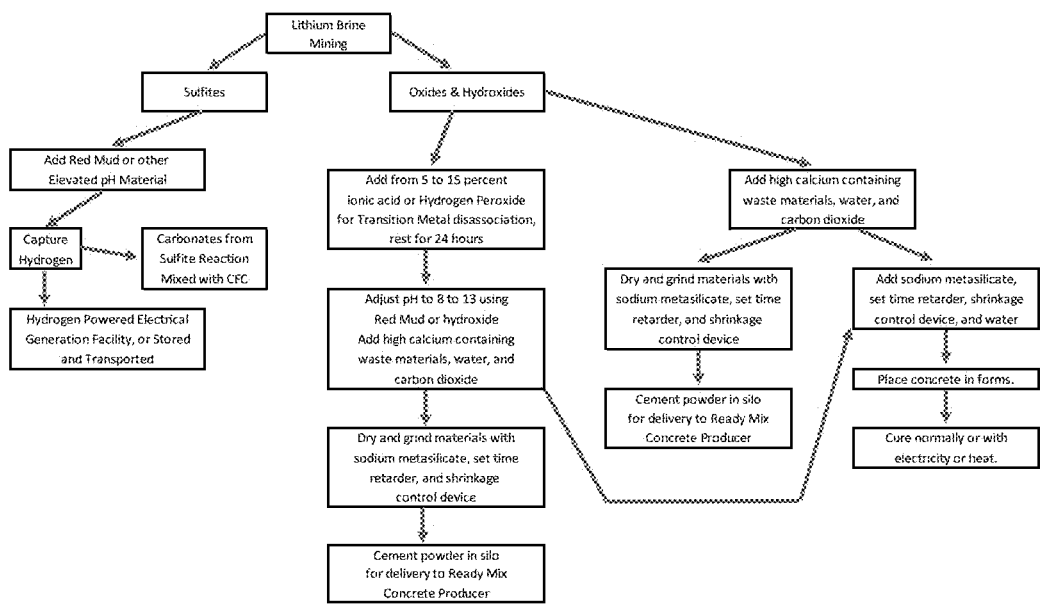
FIG. 3 is a flow chart illustrating mining waste processing to form cold fusion concrete or cement where the mining waste is lithium brine waste.

As discussed in the Background, the byproducts of lithium processing and mining include various sulfites, sulfates, silicates, carbonates, and hydroxides including zinc, ferrous, manganese, sodium, calcium, and magnesium. The byproducts are typically separated into two sides consisting of the hydroxide side and the sulfite/sulfate side. The inventor has discovered that, using cold fusion concrete technology, the hydroxide side of the lithium waste can be sequestered together with carbon dioxide, thereby producing metal carbonates, and the sulfide side of lithium waste can be treated with hydroxides, thereby converting the sulfide to a reacted zinc carbonate with the release and capture of hydrogen. The reacted carbonate can be used in cold fusion concrete as a filler and zinc oxide barrier (galvanized metal), and the hydrogen can be captured for use in hydrogen fueled power generation or other processes. The process is generally described in the flow chart presented in FIG. 3.

Figure 2:
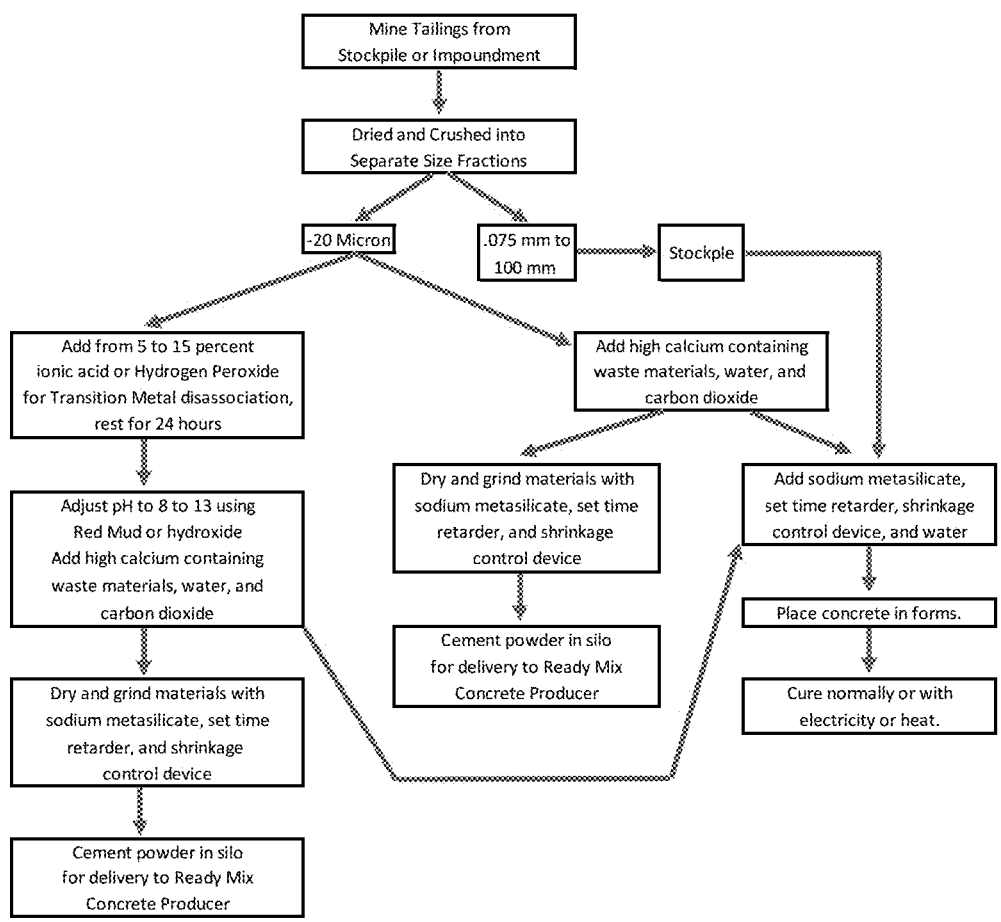
FIG. 2 is a flow chart illustrating mining waste processing to form cold fusion concrete or cement where the mining waste is mine tailings.

In addition to lithium, waste materials from gold, silver, copper, titanium, magnesium, and other metals, as discussed in the Background, collect in impoundments and piles, and are referred to as tailings. Metal mine tailings contain elevated silicon dioxide contents along with hydroxides, sulfites, sulfides, sulfates, oxides, chlorides, and other materials that are either beneficial or not detrimental to cold fusion concrete. Many of these wastes contain undesirable materials like heavy metals, arsenic, and other materials that leach into waters unless permanently confined within a concrete mass like cold fusion concrete. The process for incorporating mine tailings in cold fusion concrete is generally described in the flow chart presented in FIG. 2.

Coal is used for heating and power generation, but unused tailings are a significant problem in the U.S. and abroad. Coal tailings are the lower carbon content coal and overburden that cannot be efficiently burned in power plants. Coal tailings contain calcium, ferrous oxide, aluminum, silicon dioxide, carbon, and various other materials. Carbon dioxide is introduced into coal tailings following drying and crushing, therein sequestering carbon dioxide in the hydroxide components thereby converting into carbonates. The sequestered tailings can then be utilized in cold fusion concrete as a portion of the cementitious materials, or the sequestered tailings can be used as a permanent storage device for carbon dioxide, as a reclamation device for coal mining, as soil fill materials, or mixed with cold fusion concrete to produce aggregates.

C. Preparation of Metal Carbonates

Metal carbonates can be produced for use, e.g., as a carbon dioxide sequestered landfill, aggregates for road/highway/airport base course, aggregates for bituminous pavement, aggregates for concrete, or a simple permanent storage mechanism for carbon dioxide.

The preparation of metal carbonates may occur in alkali metals, alkaline earth metals, transition metals, or other metals. Preparing alkaline earth metal or alkali metal carbonates is typically the most convenient source of producing metal carbonates, and many times consists of reducing the particle size of the metal to about a maximum of 20 microns and exposing the metal to water and carbon dioxide. The water is utilized to allow oxides that contain a single alkaline earth/alkali metal atom and one oxygen atom to retain a hydrogen atom, allowing the now hydroxide to react with carbon dioxide and form carbonates. The water also acts as a lubricant and confinement to receive carbon dioxide and thoroughly incorporate and distribute the carbon dioxide and hydroxides for thorough incorporation and transition. Another simplistic method to produce metal carbonates is to expose the metal oxide/hydroxide to hydrogen peroxide to partially or fully disassociate the oxide first, then introduce carbon dioxide. Testing may be performed with each oxide/hydroxide to determine the best carbonate development method and verified by XRD, XRF, or other appropriate analytical procedure.

Most typically, transition metals and other metals must be disassociated prior to exposure to carbon dioxide. For example, the optimal dissolution of the iron oxides is achieved at a low pH, by using oxalic, hydrochloric, carbonic, or other acid that will act as a reducing agent by donating its elections to form $Fe^{+3}$ ions; the time of mellowing the oxide in a low pH environment is determined from the acid utilized and can vary from about 2 to 48 hours. These available iron ions will then bond with the oxidized oxalates to form iron oxalates $[Fe(C_2O_4)_2]^-$. Once these iron oxalates are formed, the pH level must then be adjusted to an elevated pH prior to adding hydrogen peroxide by adding either metasilicate, Red Mud, or hydroxides. This will allow the hydrogen peroxide to act as a reducing agent to reduce the $Fe^{+3}$ ions into $Fe^{+2}$, making the iron ions compatible to bond with the carbonates ($CO_3^{-2}$). The carbonates are then created by injecting carbon dioxide using a cellular bubble, liquid carbon dioxide, or carbon dioxide gas.

In the event that carbon dioxide is delivered using carbonic acid, carbon dioxide will be added to water form carbonic acid and then added to the disassociated mixture above. Since this weak acid will be added to a basic solution, it will deprotonate its protons to form carbonates.

Dissolving Iron Oxide with Oxalic Acid:

$$Fe_2O_3 + 4C_2O_4^{2-} + 6H^+ \rightarrow 2[Fe(C_2O_4)_2]^- + 3H_2O$$

Additional comments: dissolving iron oxide with oxalic acid at an elevated temperature (100 degrees Celsius) will expedite this process.

If a different acid is introduced in-place of oxalic acid, the chemical formulas that will change are the acid and the conjugate base of the acid.

Reacting Hydrogen Peroxide with Iron Ions in a Basic Solution:

$$2Fe^{3+} + H_2O_2 + 2OH^- \rightarrow 2Fe^{2+} + O_2 + 2H_2O$$

Additional comments: hydrogen peroxide can act either as an oxidizing or reducing agent (dependent on the pH). In order to have it act as a reducing agent, it must be added at an elevated pH.

Forming Carbonates:

$$CO_2 + H_2O \rightarrow H_2CO_3$$

$$H_2CO_3 + OH^- \rightarrow HCO_3^{1-}$$

$$HCO_3^{1-} + OH^- \rightarrow CO_3^{-2}$$

Iron Ions Bonding with Carbonates to Form Iron Carbonates:

$$Fe^{2+} + CO_3^{2-} \rightarrow FeCO_3$$

Once the carbonates are formed, they may be used as a landfill or incorporated into various construction materials as indicated previously.

D. Preparation of Cold Fusion Concrete

Cold fusion concrete is a silicon dioxide primary chemistry relying upon the glassy components of directly installed silicon dioxide (metasilicate, that during the exothermic reaction phase with water, digests, and bonds with $SiO_2$ pozzolans), various minerals, and mine waste materials to achieve an approximate 70% $SiO_2$ content, which is extremely similar to glass chemistry. The silicon dioxide, aluminum, various hydroxides and oxides, and calcium constituents in bauxite, lithium, gold, copper, silver, or other mining waste from either primary or majority constituents of the cold fusion concrete. As such, synergy between cold fusion concrete and mining waste exists. The ferrous and other metal components of the waste present no deleterious reactions in the final product and heavy metals can be encapsulated safely within the glass matrix.

Cold fusion concrete can be produced from mining waste by combining variable concentrations of the following materials such that specified strength, set time, permeability, volume stability, chemical resistance, and climate variance resistance is achieved:

about 20 to 70% by weight of the mining waste. The waste may be raw, or that which has been fully or partially processed into carbonates;

about 5 to 30% by weight of an alkali metasilicate or metasilicate pentahydrate (e.g., sodium metasilicate, calcium metasilicate, or potassium metasilicate);

about 5 to 15% by weight of a set time retarder, e.g., sodium tetraborate, boric acid, citric acid, or combination thereof;

about 20 to 70% by weight of granulated ground blast furnace slag, fly ash, or other synthetic or natural pozzolan that contains about 1 to 60% by weight of calcium hydroxide;

about 0.01 to 2% by weight of sodium caseinate, calcium caseinate, or other protein (natural or synthetic) that aids in the formation of covalent bonds;

about 0.01 to 2% by weight of an oxide or hydroxide (e.g., magnesium, calcium, potassium, lithium, aluminum) or sulfate (e.g., calcium, magnesium, potassium, lithium) that arrests plastic, drying, and autogenous shrinkage in the mixture, thereby reducing volume change; and a sufficient amount of water, if necessary, to produce a pourable consistency.

The concrete mixture may be cured normally in ambient conditions, cured with heat, or cured by electrical treatment.

Using zeolites, diatomite, polyvinyl alcohol, fluorosurfactants, or polymers at a concentration of from 0.01% to 5% (of mining waste) can be helpful should soluble carbonates or bicarbonates precipitate from the cured concrete mixture.

Using micro and macro fibers currently used in Portland Cement Concrete at concentrations ranging from 1% to 25% by weight maybe helpful for revising modulus properties to targets, increasing strength, and reducing cracking.

E. Preparation of Cement

Preparing a dry cement formulation for inclusion into cold fusion concrete mixtures at Ready Mix Concrete or other production facilities can be performed as follows:

Prepare carbonates as indicated above and dry the carbonates. After drying to a constant mass, add the carbonates to a blender and mix with:

about 5 to 30% by weight of an alkali metasilicate or metasilicate pentahydrate (e.g., sodium metasilicate, calcium metasilicate, or potassium metasilicate);

about 5 to 15% by weight of a set retarder, e.g., sodium tetraborate, boric acid, or citric acid;

about 20 to 70% by weight of granulated ground blast furnace slag, fly ash, or other synthetic or natural pozzolan that contains about 1 to 60% by weight of calcium hydroxide;

about 0.01 to 2% by weight of sodium caseinate, calcium caseinate, or other protein (natural or synthetic) that aids in the formation of covalent bonds;

about 0.01 to 2% by weight of an oxide or hydroxide (e.g., magnesium, calcium, potassium, lithium, aluminum) or sulfate (e.g., calcium, magnesium, potassium, lithium) that arrests plastic, drying, and autogenous shrinkage in the mixture, thereby reducing volume change; and grind the materials to a maximum of about 10-micron size, but more preferably about 0.5-to-5-micron size.

The cement may be used in standard concrete production by mixing the cement with aggregates (metal carbonates or naturally occurring mineral materials) and water to achieve the desired strength and viscosity. The concrete mixture may be cured normally in ambient conditions, cured with heat, or cured by electrical treatment.

Using zeolites, diatomite, a PVA, fluorosurfactants, or polymers at a concentration of from 0.01% to 5% is helpful should soluble carbonates or bicarbonates precipitate from the cured concrete mixture.

Particular embodiments of the subject matter have been described. Nevertheless, it will be understood that various modifications, substitutions, and alterations may be made. Accordingly, other embodiments are within the scope of the following claims.

What is claimed is:

1. A method of producing a cold fusion concrete composition comprising combining:
   (a) from 20 to 70% by weight of mining waste;
   (b) from 5 to 30% by weight of an alkali metasilicate or metasilicate pentahydrate;
   (c) from 1 to 15% by weight of a set reducing agent selected from the group consisting of sodium tetraborate, boric acid, citric acid, and combinations thereof;
   (d) from 20 to 70% by weight of an agent selected from the group consisting of granulated ground blast furnace slag, fly ash, synthetic or natural pozzolan that contains about 1 to 60% by weight of calcium hydroxide, and combinations thereof;
   (e) from 0.01 to 2% by weight of an agent that aids in the formation of covalent bonds selected from the group consisting of sodium caseinate, calcium caseinate, natural protein, synthetic protein, and combinations thereof;
   (f) from 0.01 to 2% by weight of an agent capable of minimizing composition shrinkage selected from the group consisting of oxides, hydroxides, sulfates, and combinations thereof; and
   (g) water, to produce a cold fusion concrete composition having a pourable consistency.

2. The method of claim 1 wherein the mining waste is selected from the group consisting of bauxite waste, metal mine tailings, lithium mining waste, coal tailings, and combinations thereof.

3. The method of claim 1 comprising pre-treating the mining waste with a disassociating agent followed by adding 0.2 to 15% by weight of mining waste of a carbon dioxide source to form metal carbonates.

4. The method of claim 3 wherein the dissociating agent is selected from the group consisting of hydrogen peroxide, acids, and combinations thereof.

5. The method of claim 4 wherein the dissociating agent is an acid selected from the group consisting of oxalic acid, hydrochloric acid, carbonic acid, nitric acid, phosphoric acid, acetic acid, and combinations thereof.

6. The method of claim 3 comprising treating the pre-treating the mining waste with from 5 to 35% by weight of mining waste of a pH adjusting agent before addition of the carbon dioxide source such that the pH of the mining waste is between 8 and 13.

7. The method of claim 3 where the carbon dioxide dioxide source is in the form of a gas, a super critical liquid, or a bubble.

8. The method of claim 6 wherein the pH adjusting agent is selected from the group consisting of alkali metal hydroxides, alkali metal metasilicates, Red Mud, and combinations thereof.

9. The method of claim 1 further comprising curing the composition by exposing the composition to ambient conditions, a direct current electrical charge, an alternating current charge, ultraviolet light, a temperature ranging from 100° F. to 160° F., or combination thereof until desired strength is achieved.

10. The method of claim 1 further comprising adding from 20 to 60% by weight aggregates to the composition.

11. The method of claim 10, where the aggregates are produced by:
   separating a cold fusion concrete composition into size fractions ranging from 200 um to 50 mm and curing the size fractions.

12. A method for preparing a cold fusion cement composition comprising combining:
   (a) from 20 to 70% by weight of mining waste;
   (b) from 5 to 30% by weight of an alkali metasilicate or metasilicate pentahydrate;
   (c) from 1 to 15% by weight of a set reducing agent selected from the group consisting of sodium tetraborate, boric acid, citric acid, and combinations thereof;
   (d) from 20 to 70% by weight of an agent selected from the group consisting of granulated ground blast furnace slag, fly ash, synthetic or natural pozzolan that contains about 1 to 60% by weight of calcium hydroxide, and combinations thereof;
   (e) from 0.01 to 2% by weight of an agent that aids in the formation of covalent bonds selected from the group consisting of sodium caseinate, calcium caseinate, natural protein, synthetic protein, and combinations thereof; and
   (f) from 0.01 to 2% by weight of an agent capable of minimizing composition shrinkage selected from the group consisting of oxides, hydroxides, sulfates, and combinations thereof to form a cold fusion cement composition.

13. The method of claim 12 comprising:
   (g) pre-treating the mining waste with a disassociating agent followed by adding 0.2 to 15% by weight of mining waste of a carbon dioxide source to form metal carbonates; and
   (h) drying and grinding the metal carbonates into a powder with a maximum particle size of 50 microns.

14. The method of claim 12 further comprising grinding the cold fusion cement composition to a particle size of from 0.1 to 5 microns.

15. The method of claim 13 further comprising grinding the cold fusion cement composition to a particle size of from 0.1 to 5 microns.

* * * * *